United States Patent
Suzuki et al.

(10) Patent No.: US 10,502,344 B2
(45) Date of Patent: Dec. 10, 2019

(54) HOSE

(71) Applicant: BRIDGESTONE CORPORATION, Tokyo (JP)

(72) Inventors: Koji Suzuki, Hayama-machi (JP); Teppei Shibata, Yokohama (JP); Youhei Tsunenishi, Yokohama (JP); Taichi Kobayashi, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 144 days.

(21) Appl. No.: 15/737,792

(22) PCT Filed: Jun. 23, 2016

(86) PCT No.: PCT/JP2016/003042
§ 371 (c)(1),
(2) Date: Dec. 19, 2017

(87) PCT Pub. No.: WO2016/208197
PCT Pub. Date: Dec. 29, 2016

(65) Prior Publication Data
US 2019/0003618 A1     Jan. 3, 2019

(30) Foreign Application Priority Data
Jun. 26, 2015 (JP) ................. 2015-129290

(51) Int. Cl.
*F16L 11/08* (2006.01)
*B32B 25/10* (2006.01)
(Continued)

(52) U.S. Cl.
CPC .............. *F16L 11/085* (2013.01); *B32B 1/08* (2013.01); *B32B 5/024* (2013.01); *B32B 15/02* (2013.01);
(Continued)

(58) Field of Classification Search
CPC ......... F16L 11/08; F16L 11/081; F16L 11/125
(Continued)

(56) References Cited

U.S. PATENT DOCUMENTS 4,870,995 A * 10/1989 Igarashi ................ F16L 11/086
                                                       138/126
4,992,314 A    2/1991 Saitoh
(Continued)

FOREIGN PATENT DOCUMENTS

JP    09-096382 A    4/1997
JP    2003-090465 A    3/2003
(Continued)

OTHER PUBLICATIONS

International Search Report for PCT/JP2016/003042 dated Sep. 13, 2016.
(Continued)

*Primary Examiner* — Patrick F Brinson
(74) *Attorney, Agent, or Firm* — Sughrue Mion, PLLC

(57) ABSTRACT

A hose includes an inner tube rubber layer, a woven material underlayer having a woven base material made of polyamide (PA) or polyethylene terephthalate (PET), and a reinforcing material layer, which are sequentially laminated on the inner rube rubber layer in this order. Following relationship formula (1) is to be satisfied, $$A \cdot t + B \cdot C < D \quad (1)$$

wherein "A" represents $SO_4^{2-}$ concentration in the inner tube rubber layer (unit: $mol/mm^3$), "t" represents thickness of the inner tube rubber layer (unit: mm), "B" represents $SO_4^{2-}$ concentration per 1 g of the woven base material (unit: mol/g), "C" represents mass of the woven base material per unit area of the woven material underlayer (unit: $g/mm^2$), and "D" represents a constant of $2.5 \times 10^{-9}$ (unit:

(Continued)

mol/mm$^2$). 100 pbm of a rubber component contains at least 60 pbm of acrylonitrile butadiene rubber (NBR) and t≥0.5 mm.

20 Claims, 1 Drawing Sheet

(51) Int. Cl.
 *B32B 1/08* (2006.01)
 *B32B 5/02* (2006.01)
 *B32B 25/14* (2006.01)
 *B32B 15/02* (2006.01)
 *B32B 25/16* (2006.01)

(52) U.S. Cl.
 CPC .............. *B32B 25/10* (2013.01); *B32B 25/14* (2013.01); *B32B 25/16* (2013.01); *F16L 11/08* (2013.01); *B32B 2262/0261* (2013.01); *B32B 2262/0284* (2013.01); *B32B 2307/714* (2013.01); *B32B 2307/7145* (2013.01); *B32B 2307/732* (2013.01); *B32B 2597/00* (2013.01)

(58) Field of Classification Search
 USPC ................................ 138/123–127; 428/36.91
 See application file for complete search history.

(56) References Cited

U.S. PATENT DOCUMENTS

| 5,316,046 | A * | 5/1994 | Igarashi | ................ F16L 11/086 138/125 |
| 6,179,008 | B1 * | 1/2001 | Kawazura | ................ B32B 7/12 138/125 |
| 7,493,917 | B2 * | 2/2009 | Hirai | ..................... F16L 11/081 138/126 |
| 2008/0202619 | A1 * | 8/2008 | Hirai | ..................... F16L 11/081 138/126 |

FOREIGN PATENT DOCUMENTS

| JP | 3659215 B2 | 6/2005 |
| JP | 2007-077270 A | 3/2007 |
| JP | 2010-254876 A | 11/2010 |
| JP | 2014-190373 A | 10/2014 |
| JP | 2014185758 A | 10/2014 |

OTHER PUBLICATIONS

Communication dated Jan. 25, 2019 from the State Intellectual Property Office of the P.R.C. in application No. 201680036160.9.
Communication dated Mar. 26, 2018, from the European Patent Office in counterpart European Application No. 16813969.9.

* cited by examiner

HOSE

CROSS REFERENCE TO RELATED APPLICATIONS

This application is a National Stage of International Application No. PCT/JP2016/003042 filed Jun. 23, 2016, claiming priority based on Japanese Patent Application No. 2015-129290 filed Jun. 26, 2015, the contents of all of which are incorporated herein by reference in their entirety.

TECHNICAL FIELD

The present invention relates to a hose.

BACKGROUND ART

A hydraulic hose is mainly used for a hydraulically operated machine of which examples include: a construction machine such as an excavator, a bulldozer; an industrial machine such as a hydraulic jack, a hydraulic puncher, a hydraulic press, a hydraulic bender; and the like. A hydraulic hoses in such a machine as described above plays an important role of transmitting driving force by way of pressure of hydraulic oil charged in the hose.

It is therefore essential that a hydraulic hose exhibits satisfactorily high oil resistance and relatively small volume expansion under pressure, as well as satisfactorily high pressure resistance and high ability of accurately and swiftly transmitting driving force (pressure). Further, a hydraulic horse must have satisfactorily high heat resistance and high durability, as well, because it is often used under a harsh environment where vibrations, bending, and the like are constantly applied.

A hydraulic hose 1, due to such characteristics required thereof as described above, generally has a laminated structure as shown in FIG. 1, where an inner tube rubber layer 2 made of rubber (the layer may occasionally be referred to as an "inner tube rubber" hereinafter) in which hydraulic oil is internally charged, a reinforcing material layer 5 for bearing pressure from the hydraulic oil, a woven material underlayer 3 (the layer may occasionally be referred to as a "woven base material" hereinafter) for protecting an unvulcanized inner tube rubber layer in the manufacturing process, and an external cover rubber layer 6 (the layer may occasionally be referred to as an "external cover rubber" hereinafter) for preventing the reinforcing material layer 5 and the inner tube rubber layer 2 from being damaged by external force, are sequentially laminated in this order. An intermediate rubber layer 4 is often provided under the reinforcing material layer 5 and it is common to provide a plurality of pairs of the reinforcing material layer 5 and the intermediate rubber layer 4 according to necessity.

The inner tube rubber layer generally uses acrylonitrile butadiene rubber (NBR) excellent in oil resistance and heat resistance and a thiuram-based compound as a vulcanization accelerator in order to improve adhesion properties thereof. Further, the reinforcing material layer generally uses a brass-plated wire as a reinforcing material (refer to PTL1, for example).

Yet further, although a case where hydraulic oil is charged in a hydraulic hose for use was described above, there is also a case, depending on an application of a hydraulic hose, where water-based hydraulic fluid is charged in the hydraulic hose. In the case where water-based hydraulic fluid is charged in a hydraulic hose, different from the case where hydraulic oil is charged therein, there exists a possibility that moisture contained in the water-based hydraulic fluid permeates into the hose, thereby corroding a reinforcing material of the reinforcing material layer. It is necessary in this regard to suppress such corrosion of a reinforcing material in the reinforcing material layer.

CITATION LIST

Patent Literature

PTL 1: JP2010-254876 Laid-Open

SUMMARY

In view of this, an object of the present disclosure is to provide a hose which is capable of suppressing corrosion of a reinforcing material in a reinforcing material layer thereof, while maintaining satisfactorily high oil resistance.

As a result of a keen study to achieve the aforementioned object, the researchers of the present disclosure discovered that it is possible to suppress corrosion of a reinforcing material in a reinforcing material layer by setting concentration of sulfate ion (per unit area) contained in cylindrical side portions of an inner tube rubber layer and a woven material underlayer to be lower than a predetermined value D, thereby completing the present disclosure.

Specifically, a hose has:

an inner tube rubber layer;

a substantially cylindrical woven material underlayer having a woven base material and provided on the outer peripheral side of the inner tube rubber layer; and a reinforcing material layer having a reinforcing material and provided on the outer peripheral side of the woven material underlayer, wherein the inner tube rubber layer is made of a rubber composition for a hose inner tube, the woven base material is formed by organic fibers made of polyimide (PA) or polyethylene terephthalate (PET), the rubber composition for a hose inner tube includes a rubber component and a vulcanization accelerator, 100 parts by mass of the rubber component contains at least 60 parts by mass of acrylonitrile butadiene rubber (NBR) therein, the inner tube rubber layer has thickness equal to or larger than 0.5 mm, and following relationship formula (1) is satisfied, $$A \cdot t + B \cdot C < D \tag{1}$$

wherein, in relationship formula (1), "A" represents concentration of sulfate ion in the inner tube rubber layer (unit: mol/mm$^3$), "t" represents thickness of the inner tube rubber layer (unit: mm), "B" represents concentration of sulfate ion per 1 g of the woven base material (unit: mol/g), "C" represents mass of the woven base material per unit area of a cylindrical side portion of the woven material underlayer (unit: g/mm$^2$), and "D" represents a constant of 2.5×10$^{-9}$ (unit: mol/mm$^2$).

According to the present disclosure, it is possible to provide a hose which is capable of suppressing corrosion of a reinforcing material in a reinforcing material layer thereof, while maintaining satisfactorily high oil resistance.

DETAILED DESCRIPTION

Figure 1:
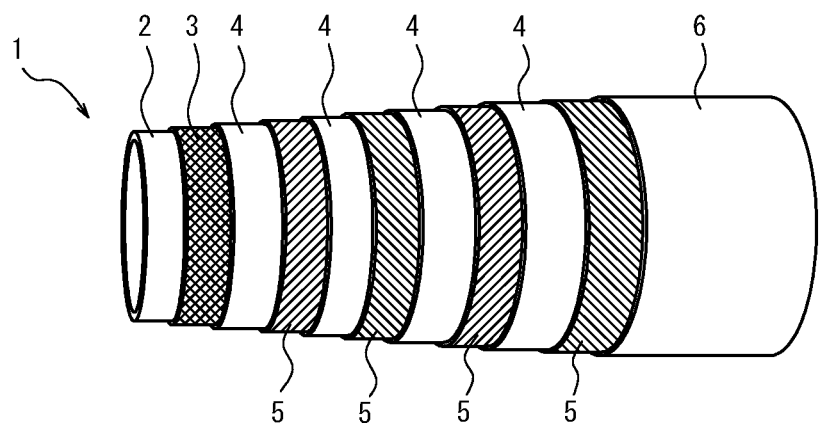
FIG. 1 is a perspective view showing an example of a wire-spiral structure as a laminated structure of a hose of one embodiment according to the present disclosure.
Figure 2:
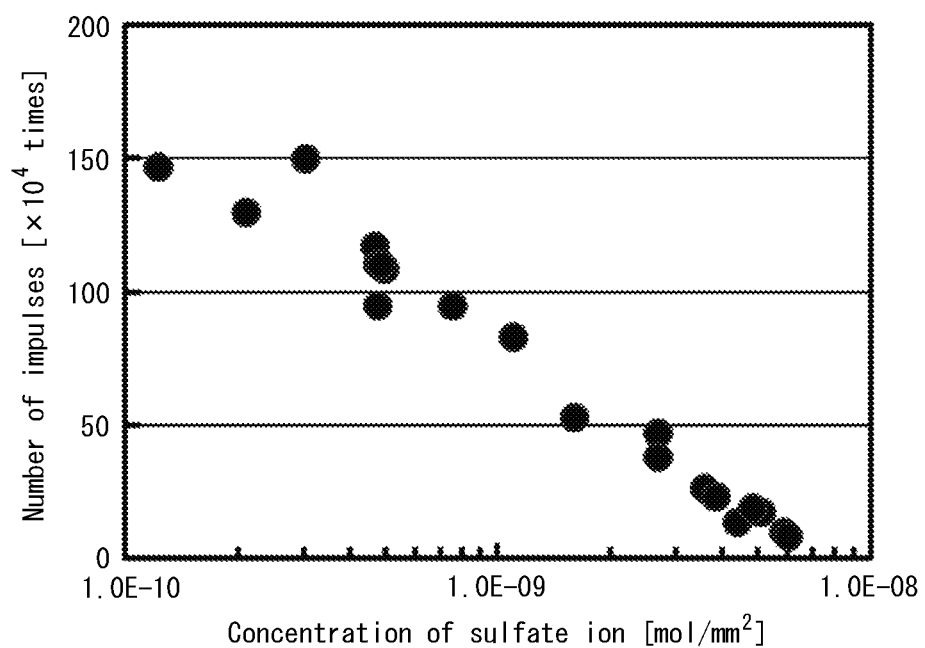
FIG. 2 is a graph (Y axis: number of impulses, X axis: concentration of sulfate ion) showing the result of a hydraulic pressure impulse test using water (an impulse test).

In the present specification, "sulfate ion" represents sulfate ion or sulfite ion, "A: concentration of sulfate ion in an inner tube rubber layer (unit: mol/mm$^3$)" represents "the number of moles of sulfate ion per 1 mm$^3$ of an inner tube rubber layer", "t: thickness of an inner tube rubber layer (mm)" represents "the average of thickness values of an inner tube rubber layer arbitrarily measured at four points thereof", "B: concentration of sulfate ion per 1 g of a woven base material (unit: mol/g)" represents "the number of moles of sulfate ion contained per 1 g of a woven base material", "C: mass of a woven base material per unit area of a cylindrical side portion of a woven material underlayer (unit: g/mm$^2$)" represents the number of grams of the woven base material per 1 mm$^2$ of a cylindrical side portion of a woven material underlayer (unit: g/mm$^2$)", and "D: a constant of 2.5×10$^{-9}$ (unit: mol/mm$^2$)" represents "the number of moles of sulfate ion per unit area of a hose side portion", hereinafter.

(Hose)

A hose of the present disclosure will be demonstratively described in detail according to one embodiment thereof hereinafter.

The hose of the present disclosure has at least an inner tube rubber layer, a woven material underlayer, and a reinforcing material layer and optionally an intermediate rubber layer, an external cover rubber layer, and other members.

The hose of the present disclosure preferably includes: at least one intermediate rubber layer and at least one reinforcing material layer, which are alternately provided on the outer peripheral side of the inner tube rubber layer; and an external cover rubber layer provided on the outer peripheral side of the outermost reinforcing material layer.

Further, the hose of the present disclosure satisfies following relationship formula (1).

$$A \cdot t + B \cdot C < D \qquad (1)$$

wherein, in relationship formula (1), "A" represents concentration of sulfate ion in the inner tube rubber layer (unit: mol/mm$^3$), "t" represents thickness of the inner tube rubber layer (unit: mm), "B" represents concentration of sulfate ion per 1 g of the woven base material (unit: mol/g), "C" represents mass of the woven base material per unit area of a cylindrical side portion of the woven material underlayer (unit: g/mm$^2$), and "D" represents a constant of 2.5×10$^{-9}$ (unit: mol/mm$^2$).

According to the hose of the present disclosure, it is possible to suppress corrosion of a reinforcing material in the reinforcing material layer by setting concentration of sulfate ion (per unit area) contained in cylindrical side portions of the inner tube rubber layer and the woven material underlayer to be lower than a predetermined value D.

The left side of relationship formula (1) represents concentration of sulfate ion (per unit area) contained in cylindrical side portions of the inner tube rubber layer and the woven material underlayer.

The value of "A·t" is preferably ≤1.2×10$^{-9}$, more preferably ≤1.0×10$^{-9}$, and particularly preferably ≤5.0×10$^{-10}$.

The value of "B·C" is preferably ≤1.2×10$^{-9}$, more preferably ≤1.0×10$^{-10}$, and particularly preferably ≤6.0×10$^{-11}$.

The right side of relationship formula (1) represents "the number of moles of sulfate ion per unit area of a hose side portion".

The value of "D" is not limited to the constant: 2.5×10$^{-9}$ (unit: mol/mm$^2$) and "D" lower than 2.5×10$^{-9}$ is rather preferable. Specifically, "D" is preferably ≤1.7×10$^{-9}$ and more preferably ≤6.1×10$^{-10}$.

<Inner Tube Rubber Layer>

The inner tube rubber layer is made of a rubber composition for a hose inner tube. Thickness of the inner tube rubber layer, i.e. "t" in the aforementioned relationship formula (1), is not particularly restricted, as long as it is equal to or larger than 0.5 mm, and may be appropriately selected according to an application of the hose. The thickness "t" is preferably in the range of 0.5 mm to 3.0 mm, more preferably in the range of 0.5 mm to 2.0 mm, and particularly preferably in the range of 0.5 mm to 1.5 mm.

When the thickness of the inner tube rubber layer is smaller than 0.5 mm, the inner tube rubber layer cannot bear the pressure and breaks. The thickness of the inner tube rubber layer ≥0.5 mm ensures that the inner tube rubber layer can safely bear the pressure and the thickness of the inner tube rubber layer ≤3.0 mm improves flexibility and pressure resistance of the inner rubber tube. In this regard, the thickness of the inner tube rubber layer in the aforementioned more preferable range will be more advantageous in terms of flexibility and pressure resistance of the hose inner tube and the thickness of the inner tube rubber layer in the aforementioned particularly preferable range will be further more advantageous in terms of flexibility and pressure resistance of the hose inner tube.

<<Rubber Composition for Hose Inner Tube>>

The rubber composition for a hose inner tube includes at least a rubber component and a vulcanization accelerator and optionally other components.

—Rubber Component—

The rubber component contains at least acrylonitrile butadiene rubber (NBR) and optionally other polymers therein.

—Acrylonitrile Butadiene Rubber (NBR)—

Inclusion of acrylonitrile butadiene rubber (NBR) in the rubber component significantly improves oil resistance of the hose inner tube.

Content of acrylonitrile butadiene rubber (NBR) in the rubber component is not particularly restricted, as long as the content of NBR is at least 60 parts by mass with respect to 100 parts by mass of the rubber component, and may be appropriately selected according to an application of the hose. The content of NBR in the rubber component is preferably in the range of 70-100 parts by mass and more preferably in the range of 80-100 parts by mass with respect to 100 parts by mass of the rubber component.

The content of acrylonitrile butadiene rubber (NBR) in the rubber component ≥60 parts by mass with respect to 100 parts by mass of the rubber component ensures satisfactorily high oil resistance of the hose inner tube. The content of NBR in the rubber component ≥70 parts by mass, preferably 80≥parts by mass, with respect to 100 parts by mass of the rubber component further improves oil resistance of the hose inner tube, which is obvious from comparison of Example 1 with Example 2 described below.

Content of acrylonitrile (AN content) in acrylonitrile butadiene rubber (NBR) is not particularly restricted and may be appropriately selected according to an application of the hose. The AN content in NBR is preferably in the range of 20-41 mass % and more preferably in the range of 25-41 mass %.

The AN content in NBR ≥20 mass % successfully achieves the oil resistance required of the inner tube rubber layer of the hose and the AN content in NBR ≤41 mass % reliably prevents the low temperature properties of the inner tube rubber layer from deteriorating. In this regard, the AN content in NBR in the aforementioned more preferable range will be advantageous in terms of improving oil resistance and low temperature properties of the inner tube rubber layer of the hose.

—Other Polymers—

Types of the aforementioned other polymers are not particularly restricted and may be appropriately selected according to an application of the hose. Examples of the other polymers include: synthetic rubber such as butadiene rubber, styrene-butadiene rubber, ethylene-propylene-diene rubber, isoprene rubber, butyl rubber, halogenated butyl rubber, chloroprene rubber, isobutylene-isoprene rubber, hydrogenated acrylonitrile rubber, silicone rubber, actyl rubber, epoxidized natural rubber, acrylate butadiene rubber, and the like; those obtained by modifying the ends of molecular chains of these synthetic rubbers or natural rubber; and the like. These examples may be used either solely or as combination of two or more types.

—Vulcanization Accelerator—

Type of the vulcanization accelerator is not particularly restricted and may be appropriately selected according to an application of the hose. Examples of the vulcanization accelerator include a thiazole-based compound, a sulfenamide-based compound, a guanidine-based compound, and the like. These examples may be used either solely or as combination of two or more types.

In this regard, it is preferable to limit content of a thiuram-based compound as a vulcanization accelerator to a predetermined value or less in terms of reducing concentration of sulfate ion in the inner tube rubber layer. Concentration of sulfate ion in the inner tube rubber layer can be suppressed by limiting content of a thiuram-based compound as a vulcanization accelerator to a predetermined value or less.

It is preferable in the hose of the present disclosure that the vulcanization accelerator includes at least one selected from the group consisting of a thiazole-based compound, a sulfenamide-based compound and a guanidine-based compound.

Content of a thiuram-based vulcanization accelerator per 1 g of the aforementioned polymer component is preferably in the range of 0 mol to $3.1 \times 10^5$ mol. This specific range was calculated from the amount of a thiuram-based vulcanization accelerator, which amount made the left side value of relationship formula (1) equal to "D" in a case where the same PET thread woven base material as used in Examples of the present disclosure was employed.

When the content of a thiuram-based vulcanization accelerator per 1 g of the aforementioned polymer component is equal to or less than $3.1 \times 10^{-5}$ mol, it is possible to suppress generation of sulfate ion and thus well prevent corrosion of the reinforcing material layer from occurring. That is, it is possible to achieve 400,000 or more (the number of impulses) in an "impulse test" described below.

It is preferable in the hose of the present disclosure that content, per 1 g of the aforementioned polymer component, of a thiuram-based compound contained in the inner tube rubber layer is equal to or less than $3.1 \times 10^{-5}$ mol. It is possible by this arrangement to further reduce concentration of sulfate ion in the inner tube rubber layer and thus furthermore reliably suppress corrosion of a reinforcing material in the reinforcing material layer.

—Thiazole-Based Compound—

Type of the thiazole-based compound is not particularly restricted and may be appropriately selected according to an application of the hose. Examples of the thiazole-based compound include 2-mercaptobenzothiazole (MBT), dibenzothiazyl disulfide (MBTS), and the like. These examples may be used either solely or as combination of two or more types.

Content of the thiazole-based compound in the rubber component is not particularly restricted and may be appropriately selected according to an application of the hose. The content of the thiazole-based compound in the rubber component is preferably in the range of 0.2 to 5 parts by mass and more preferably in the range of 0.5 to 4 parts by mass with respect to 100 parts by mass of the rubber component.

When the content of the thiazole-based compound in the rubber component is ≥0.2 parts by mass with respect to 100 parts by mass of the rubber component, satisfactory vulcanization is ensured. When the same content is ≤5 parts by mass with respect to 100 parts by mass of the rubber component, satisfactory flexibility is ensured.

—Sulfenamide-Based Compound—

Type of the sulfenamide-based compound is not particularly restricted and may be appropriately selected according to an application of the hose. Examples of the sulfenamide-based compound include N-cyclohexyl-2-benzothiazole sulfenamide (CBS), N-tert-butyl-2-benzothiazole sulfenamide (BBS), and the like. These examples may be used either solely or as combination of two or more types.

Content of the sulfenamide-based compound in the rubber component is not particularly restricted and may be appropriately selected according to an application of the hose. The content of the sulfenamide-based compound in the rubber component is preferably in the range of 0.2 to 5 parts by mass and more preferably in the range of 0.5 to 4 parts by mass with respect to 100 parts by mass of the rubber component.

When the content of the sulfenamide-based compound in the rubber component is ≥0.2 parts by mass with respect to 100 parts by mass of the rubber component, satisfactory vulcanization is ensured. When the same content is ≤5 parts by mass with respect to 100 parts by mass of the rubber component, satisfactory flexibility is ensured.

—Guanidine-Based Compound—

Type of the guanidine-based compound is not particularly restricted and may be appropriately selected according to an application of the hose. Examples of the guanidine-based compound include di-o-tolylguanidine (DOTG), 3-diphenylguanidine (DPG), and the like. These examples may be used either solely or as combination of two or more types.

Content of the guanidine: based compound in the rubber component is not particularly restricted and may be appropriately selected according to an application of the hose. The content of the guanidine-based compound in the rubber component is preferably in the range of 0.2 to 5 parts by mass and more preferably in the range of 0.5 to 4 parts by mass with respect to 100 parts by mass of the rubber component.

When the content of the guanidine-based compound in the rubber component is ≥0.2 parts by mass with respect to 100 parts by mass of the rubber component, satisfactory vulcanization is ensured. When the same content is ≤5 parts by mass with respect to 100 parts by mass of the rubber component, satisfactory flexibility is ensured.

—Thiuram-Based Compound—

Type of the thiuram-based compound is not particularly restricted and may be appropriately selected according to an application of the hose. Examples of the thiuram-based compound include tetramethylthiuram disulfide (TMTD), tetramethylthiuram monosulfide (TMTM), tetraethylthiuram disulfide (TETD), tetrabutylthiuram disulfide (TBTD), and the like. These examples may be used either solely or as combination of two or more types.

Commercially available products can be used as these vulcanization accelerators and examples thereof include Noccelar TT (TMTD), Noccelar TS (TMTM), Noccelar TET (TETD), Noccelar TBT (TBTD), and the like.

—Other Components—

Additives generally used in the rubber industry may be appropriately selected and added as the aforementioned other components to the rubber composition unless such addition adversely affects the object of the present disclosure, and examples of the other components include: inorganic filler such as carbon black, silica, talc, clay, calcium carbonate, and the like; antioxidant; petroleum resin; plasticizer; cross-linking agent such as sulfur; vulcanization accelerator such as zinc oxide (zinc white), stearic acid, and the like; vulcanization retarder; wax; anti-scorching agent; softening agent; adhesion assisting agent such as silane-coupling agent, metal salt of organic acid, resorcin, hexamethylenetetramine, melamine resin, and the like; metal compound such as magnesium oxide, calcium oxide, aluminum hydroxide, magnesium hydroxide, calcium hydroxide; and the like. Commercially available products can be suitably used as these additives.

The rubber composition for a hose inner tube can be manufactured by adding the optionally selected various additives described above to the essential components including the rubber component and the vulcanization accelerator and subjecting the mixture to kneading, warming, extrusion, and the like.

A method for blending the aforementioned respective components in a process of obtaining the rubber composition for a hose inner tube is not particularly restricted. The raw materials of all of the components may be combined at the same time and kneaded, or the respective components may be added and kneaded at two or three stages with time difference therebetween. A conventional kneader such as a roll, an internal mixer, a banbury rotor mixer, or the like may be used in the kneading process.

The vulcanization condition during a curing process of the rubber composition is not particularly restricted. For example, a standard vulcanization condition of vulcanizing a rubber composition for 10 minutes to 90 minutes at temperature in the range of 140° C. to 180° C. may be employed.

<Woven Material Underlayer>

The woven material underlayer is a layer provided on the outer peripheral side of the inner tube rubber layer and includes organic fibers as the woven base material. The woven material underlayer has a substantially cylindrical shape.

Thickness of the woven material underlayer is not particularly restricted and may be appropriately selected according to an application of the hose. The thickness of the woven material underlayer is preferably in the range of 0.3 mm to 1.5 mm and more preferably in the range of 0.3 mm to 1.0 mm.

When thickness of the woven material underlayer is ≥0.3 mm, the inner tube rubber layer in the unvulcanized state can be reliably protected. When thickness of the woven material underlayer is mm, the outer diameter of the hose can be made sufficiently small. In this regard, thickness of the woven material underlayer within the aforementioned preferable range will be advantageous in terms of making the outer diameter of the hose sufficiently small.

—Organic Fibers—

A material of the organic fibers may be either polyamide (PA) or polyethylene terephthalate (PET). Polyamide (PA), however, is preferable in terms of reducing concentration of sulfate ion, as is obviously known from comparison of Example 3-2 with Example 4 described below.

It should be noted that such synthetic fiber as Vinylon® obtained by acetalization of polyvinyl alcohol by using sulfuric acid is not preferable as a material of the organic fibers in the present disclosure.

The aforementioned organic fibers may be subjected to resorcinol formaldehyde latex (RFL) dip.

A configuration of the organic fibers is not particularly restricted and may be appropriately selected according to an application of the hose, and examples of the configuration include thread-like, tape-like configurations.

<Reinforcing Material Layer>

The reinforcing material layer is a layer provided on the outer peripheral side of the woven material underlayer and includes a reinforcing material.

Thickness of each reinforcing material layer is not particularly restricted and may be appropriately selected according to an application of the hose. The thickness of each reinforcing material layer is preferably in the range of 0.2 mm to 1 mm, more preferably in the range of 0.2 mm to 0.8 mm, and particularly preferably in the range of 0.2 mm to 0.5 mm.

When thickness of the reinforcing material layer is ≥0.2 mm, the hose can effectively improve pressure resistance thereof. When thickness of the reinforcing material layer is ≤1 mm, an increase in bending rigidity of the hose can be suppressed. In this regard, thickness of the reinforcing material layer within the aforementioned preferable range will be advantageous and the same thickness within the aforementioned particularly preferable range will be even more advantageous in terms of suppressing an increase in bending rigidity of the hose.

—Reinforcing Material—

Type of the reinforcing material is not particularly restricted and may be appropriately selected according to an application of the hose. Examples of the reinforcing material include brass-plated steel wire, zinc-plated steel wire, and the like. These examples may be used either solely or as combination of two or more types.

Configuration of the reinforcing material is not particularly restricted and may be appropriately selected according to an application of the hose. Examples of the configuration of the reinforcing material include a wire-like configuration, a steel cord-like configuration in which a plurality of steel wires have been twined. These examples may be used either solely or as combination of two or more types.

<Intermediate Rubber Layer>

The intermediate rubber layer is a layer provided on the outer peripheral side of the inner tube rubber layer such that the intermediate rubber layer and the reinforcing material layer are disposed alternately.

Thickness of each intermediate rubber layer is not particularly restricted and may be appropriately selected according to an application of the hose. The thickness of each reinforcing material layer is preferably in the range of 0.2 mm to 1 mm, more preferably in the range of 0.2 mm to 0.5 mm, and particularly preferably in the range of 0.2 mm to 0.4 mm.

When thickness of the intermediate rubber layer is ≥0.2 mm, the intermediate rubber layer as a cushioning material between the reinforcing material layers can effectively prevent these reinforcing material layers from making contact with each other. When thickness of the intermediate rubber layer is ≤1 mm, the outer diameter of the hose can be made sufficiently small. In this regard, thickness of the intermediate rubber layer within the aforementioned preferable range will be advantageous and the same thickness within the aforementioned particularly preferable range will be even more advantageous in terms of making the outer diameter of the hose sufficiently small.

Type of a material of the intermediate rubber layer is not particularly restricted and may be appropriately selected according to an application of the hose. Examples of the material of the intermediate rubber layer include acrylonitrile butadiene rubber, styrene-butadiene rubber, chloroprene rubber, and the like.

<External Cover Rubber Layer>

The external cover rubber layer is a layer provided on the outer peripheral side of the outermost reinforcing material layer.

Thickness of the external cover rubber layer is not particularly restricted and may be appropriately selected according to an application of the hose. The thickness of the external cover rubber layer is preferably in the range of 1 mm to 4 mm, more preferably in the range of 1 mm to 3 mm, and particularly preferably in the range of 1 mm to 2 mm.

When thickness of the external cover rubber layer is ≥1 mm, the reinforcing material layer and the inner tube rubber layer can be reliably protected from the external environment. When thickness of the external cover rubber layer is ≤4 mm, the outer diameter of the hose can be made sufficiently small. In this regard, thickness of the external cover rubber layer within the aforementioned preferable range will be advantageous and the same thickness within the aforementioned particularly preferable range will be even more advantageous in terms of making the outer diameter of the hose sufficiently small.

Type of a material of the external cover rubber layer is not particularly restricted and may be appropriately selected according to an application of the hose. Examples of the material of the external cover rubber layer include acrylonitrile butadiene rubber, styrene-butadiene rubber, chloroprene rubber, butadiene rubber, ethylene-propylene rubber, and the like.

<Laminated Structure>

An example of a laminated structure of the hose of the one embodiment according to the present disclosure is shown in FIG. 1. In FIG. 1, the hose 1 is a high pressure hose including: the inner tube rubber layer 2 for sealing internal fluid; the woven material underlayer 3 made of organic fibers and provided on the outer peripheral side of the inner tube rubber layer 2; the intermediate rubber layer 4 provided on the outer peripheral side of the woven material underlayer 3; the reinforcing material layer 5 having brass-plated wires as a reinforcing material and provided such that the intermediate rubber layer 4 and the reinforcing material layer 5 are disposed alternately, for ensuring pressure-resistance performance of the hose; and the external cover rubber layer 6 as the outermost layer for protection from the external environment.

Although the structure of the hose described above is constituted of a plurality of layers including the inner tube rubber layer 2, the woven material underlayer 3, four pairs of the intermediate rubber layer 4 and the reinforcing material layer 5, and the external cover rubber layer 6 radially laminated from the inner side toward the outer side in this order, the laminated structure is not limited thereto and an appropriate laminated structure may be selected in accordance with the properties required of the hose. It is acceptable to provide a resin layer made of ultra high molecular weight polyethylene (UHMW-PE) or the like as the outermost layer, to further improve wear resistance, oil resistance and water resistance of the hose.

<Method for Manufacturing Hose>

Examples of a method for manufacturing the hose of the present disclosure include a below-described method having processes of: extruding an inner tube around a mandrel; forming a woven material underlayer; weaving wires to form a reinforcing material layer; extruding an external cover; wrapping the external cover with a sheet; vulcanizing the laminated structure; unwrapping the laminated structure thus vulcanized; removing the mandrel; and optionally conducting other processing.

Specifically, with reference to the hose having the structure of FIG. 1, for example, the method includes the processes of extrusion-molding a rubber composition for the inner tube rubber layer 2 on the outer side of a mandrel having a diameter substantially equal to the inner diameter of the hose, to cover the mandrel and form the inner tube rubber layer 2 (the inner tube extrusion process); introducing a layer made of organic fibers, i.e. the woven material underlayer 3, onto the inner tube rubber layer 2 for protecting the inner tube rubber layer during the wire-weaving process (the woven material underlayer formation process); then weaving a predetermined number of brass-plated wires on the outer side of the woven material underlayer 3 thus formed in the woven material underlayer formation process, to form the reinforcing material layer 5 (the wire-weaving process); insert-molding a rubber sheet between the woven material underlayer 3 and the reinforcing material layer 5, to form the intermediate rubber layer 4; repeating several times formation of the reinforcing material layer 5 and formation of the intermediate rubber layer 4 thereunder by insert-molding, thereby sequentially providing the intermediate rubber layers 4 and the reinforcing material layers 5 in an alternate manner; extrusion-molding the external cover rubber layer 6 on the outermost reinforcing material layer 5 (the external cover extrusion process); wrapping the outer side of the external cover rubber layer 6 thus formed in the external cover extrusion process with an appropriate textile material (the sheet-wrapping process); vulcanizing the laminated structure thus wrapped (the vulcanization process); removing the textile material after the vulcanization (the unwrapping proves); and removing the mandrel (the mandrel removal process). As a result, there is obtained a hose having the woven material underlayer 3, the intermediate rubber layer 4 and the reinforcing material layer 5 between the inner tube rubber layer 2 and the external cover rubber layer 6. In general, provision of one to eight reinforcing material layers 5 ensures suitable use of the hose.

EXAMPLES

The present disclosure will be described further in detail by Examples which include both working and prophetic examples hereinafter. The present disclosure is not limited by any means to these Examples and may be appropriately changed or modified unless such a change/modification digresses from the spirit of the present disclosure.

Test hoses are/were prepared and evaluated. The method for manufacturing test hoses and the methods for evaluating the test hoses are described below. The unit of the values shown as the blended amounts of the components in Table 1 is parts by mass.

<Method for Manufacturing Hose>

A hose having a woven material underlayer and four pairs of an intermediate rubber layer and a reinforcing material layer between an inner tube rubber layer and an external cover rubber layer is/was obtained by: extrusion-molding a rubber composition of each formulation shown in Table 1, for an inner tube rubber layer, on the outer side of a mandrel having a diameter substantially equal to the inner diameter (19 mm) of the hose, to cover the mandrel and form an inner tube rubber layer; introducing a woven material underlayer made of organic fibers, i.e. the woven base material as shown in Table 1, onto the inner tube rubber layer; then weaving a predetermined number of brass-plated wires on the outer side of the woven material underlayer thus formed in the woven material underlayer formation process, to form a reinforcing material layer; insert-molding a rubber sheet between the woven material underlayer and the reinforcing material layer, to form an intermediate rubber layer; repeating several times formation of the reinforcing material layer and formation of the intermediate rubber layer thereunder by insert-molding, thereby sequentially laminating four pairs of the intermediate rubber layer and the reinforcing material layer; extrusion-molding an external cover rubber layer on the outermost reinforcing material layer; wrapping the outer side of the external cover rubber layer thus formed, with an appropriate textile material; vulcanizing the laminated structure thus wrapped under the predetermined conditions; removing the textile material after the vulcanization; and removing the mandrel.

<Method for Evaluating Hose>

(1) Method for Measuring "A: Concentration of Sulfate Ion in Inner Tube Rubber Layer (Unit: mol/mm$^3$)"

The concentration A (unit: mol/mm$^3$) of sulfate ion of the inner tube rubber layer is/was determined by: collecting the inner tube rubber by a predetermined weight from the hose; boiling the rubber thus collected in a predetermined amount of pure water, thereby extracting ions in the rubber; collecting the extraction solution and measuring concentrations of ions in the solution by using ion chromatography; and calculating the concentration A (unit: mol/mm$^3$) of sulfate ion in the inner tube rubber layer from the relevant ion concentration thus measured and the prescribed weight and the density of the rubber. The results are shown in Table 1.

(2) Method for Measuring "t: Thickness of Inner Tube Rubber Layer (Mm)"

The thickness "t" is/was determined by: removing all of the external cover rubber layer, the reinforcing material layers and the intermediate rubber layers from the hose; measuring thickness of the remaining inner tube rubber layer at each of four arbitrarily selected measuring points of the layer; calculating the average of the four thickness values thus measured; and regarding the average as "t". The results are shown in Table 1.

(3) Method for Measuring "B: Concentration of Sulfate Ion Per 1 g of Woven Base Material (Unit: mol/g)"

The concentration B (unit: mol/g) of sulfate ion per 1 g of woven base material is/was determined by: collecting the woven base material by a predetermined weight from the hose; boiling the woven base material thus collected in a predetermined amount of pure water, thereby extracting ions in the woven base material; collecting the extraction solution and measuring concentrations of ions in the solution by using ion chromatography; and calculating the concentration B (unit: mol/g) of sulfate ion per 1 g of the woven base material from the relevant ion concentration thus measured and the prescribed weight and the density of the woven base material. The results are shown in Table 1.

(4) Method for Measuring "C: Mass of Woven Base Material Per Unit Area of Cylindrical Side Portion of Woven Material Underlayer (Unit: g/mm$^2$)"

The mass C (unit: g/mm$^2$) of the woven base material per unit area of a cylindrical side portion of the woven material underlayer is/was calculated from the length of the woven base material used per 1 m of the hose, the mass of the woven base material per unit area, and the outer diameter of the inner tube rubber layer. The results are shown in Table 1.

(5) Method for Determining "D: Constant of $2.5 \times 10^{-9}$ (Unit: mol/mm$^2$)"

The constant D is/was determined by: carrying out the below-mentioned hydraulic pressure impulse test (the impulse test) using water, for a plurality of hoses having different sulfate ion concentrations A of the inner tube rubber layers; finding the highest value of the sulfate ion concentration A, at which the hose can somehow bear the predetermined threshold number (400,000) of impulses or the minimum level of fatigue which the market expects the hose to bear; and regarding the value as "D".

(6) Evaluation of Water Resistance

Water resistance of the test hose is/was evaluated by: carrying out the below-mentioned hydraulic pressure impulse test (the impulse test) using water; counting the number of impulses required for breaking the hose; and comparing the number of impulses thus counted, with the evaluation criteria shown below, for evueluation. The results are tabulated in Table 1.

<Impulse Test>

An impulse test is/was carried out by: attaching, to the respective ends of the hose, mouth fittings for connecting the hose with testing machines; firmly connecting the hose with a mechanism for pressurizing hydraulic fluid inside the hose and an impulse testing machine equipped with a temperature regulator; charging water-based hydraulic fluid in the hose; repeatedly applying impact pressure of 37.2 MPa (having a waveform according to JIS K6330-8) at frequency of 0.3 Hz to the hose, with maintaining the temperature of the hydraulic fluid at 70° C.; and counting the number of impulses required for breaking the hose.

<Evaluation Criteria>

Excellent: 600,000 times or more

Good: 400,000 times or more and less than 600,000 times

Poor: Less than 400,000

(7) Evaluation of Oil Resistance

Oil resistance of the test hose is/was evaluated by: carrying out the below-mentioned hydraulic pressure impulse test (the impulse test) using hydraulic oil (Product name: "Diesel CF30", manufactured by JX Nikko Nisseki Energy Corporation); counting the number of impulses required for breaking the hose; and comparing the number of impulses thus counted, with the evaluation criteria shown below, for evaluation. The results are tabulated in Table 1.

<Impulse Test>

An impulse test is/was carried out by: attaching, to the respective ends of the hose, mouth fittings for connecting the hose with testing machines; firmly connecting the hose with a mechanism for pressurizing hydraulic fluid inside the hose and an impulse testing machine equipped with a temperature regulator; charging the aforementioned hydraulic oil in the hose; repeatedly applying impact pressure of 37.2 MPa (having a waveform according to JIS K6330-8) at frequency of 1 Hz to the hose, with maintaining the temperature of the hydraulic fluid at 100° C.; and counting the number of impulses required for breaking the hose.

<Evaluation Criteria>
Excellent: 600,000 times or more
Good: 400,000 times or more and less than 600,000 times
Poor: Less than 400,000

TABLE 1

| | | | Comp. Example 1 | Example 1 | Example 2 | Example 3 | Comp. Example 2 | Comp. Example 3 |
|---|---|---|---|---|---|---|---|---|
| Inner tube rubber layer | Rubber component | NBR *1 | 50 | 60 | 80 | 100 | 100 | 100 |
| | | Other polymers *2 | 50 | 40 | 20 | 0 | 0 | 0 |
| | Vulcanization accelerator | Thiazole-based compound *3 | 2.5 | 2.5 | 2.5 | 2.5 | 0 | 0.5 |
| | | Thiuram-based compound *4 | 0 | 0 | 0 | 0 | 2 | 1.6 |
| | Other components | Carbon black *5 | 70 | 70 | 70 | 70 | 70 | 70 |
| | | Anti-oxidant *6 | 1 | 1 | 1 | 1 | 1 | 1 |
| | | Plasticizer *7 | 10 | 10 | 10 | 10 | 10 | 10 |
| | | Sulfur *8 | 1.5 | 1.5 | 1.5 | 1.5 | 1.5 | 1.5 |
| | | Zinc white *9 | 5 | 5 | 5 | 5 | 5 | 5 |
| | | Vulcanization retarder *10 | 0.5 | 0.5 | 0.5 | 0.5 | 0.5 | 0.5 |
| | | A: Concentration of sulfate ion (mol/mm$^2$) | $3.4 \times 10^{-10}$ | $3.4 \times 10^{-10}$ | $3.6 \times 10^{-10}$ | $3.3 \times 10^{-10}$ | $4.8 \times 10^{-2}$ | $3.9 \times 10^{-9}$ |
| | | t: Thickness (mm) | 1.23 | 1.25 | 1.25 | 1.26 | 1.24 | 1.23 |
| | | Outer diameter (mm) | 21.46 | 21.50 | 21.50 | 21.52 | 21.48 | 21.46 |
| Woven material underlayer | Woven base material | PET (%) | 100 | 100 | 100 | 100 | 100 | 100 |
| | | PA (%) | 0 | 0 | 0 | 0 | 0 | 0 |
| | | Vinylon ® (%) | 0 | 0 | 0 | 0 | 0 | 0 |
| | | B: Concentration of sulfate ion per 1 g of woven base material (unit: mol/g) | $2.3 \times 10^{-7}$ | $1.9 \times 10^{-7}$ | $2.1 \times 10^{-7}$ | $2.6 \times 10^{-7}$ | $2.5 \times 10^{-7}$ | $2.3 \times 10^{-7}$ |
| | | C: mass of woven base material per unit area of cylindrical side portion of woven material underlayer (g/mm$^2$) | $2.2 \times 10^{-4}$ | $2.2 \times 10^{-4}$ | $2.2 \times 10^{-4}$ | $2.2 \times 10^{-4}$ | $2.2 \times 10^{-4}$ | $2.2 \times 10^{-4}$ |
| Intermediate rubber layer | | Number of layers | 4 | 4 | 4 | 4 | 4 | 4 |
| Reinforcing material layer | | Number of layers | 4 | 4 | 4 | 4 | 4 | 4 |
| | | Laminated structure | FIG. 1 | FIG. 1 | FIG. 1 | FIG. 1 | FIG. 1 | FIG. 1 |
| | | Left side: A + t + B + C Concentration of sulfate ion (per unit area) contained in cylindrical side portions of inner tube rubber layer and woven material underlayer (mol/mm$^2$) | $4.7 \times 10^{-10}$ | $4.7 \times 10^{-10}$ | $5.0 \times 10^{-10}$ | $4.7 \times 10^{-10}$ | $6.0 \times 10^{-2}$ | $4.8 \times 10^{-9}$ |
| | | Is Relationship formula (1) satisfied? | Excellent | Excellent | Excellent | Excellent | Poor | Poor |
| | | Water resistance performance | Excellent | Excellent | Excellent | Excellent | Poor | Poor |
| | | Oil resistance performance | Poor | Good | Excellent | Excellent | Excellent | Excellent |

| | | | Comp. Example 4 | Comp. Example 5 | Example 3-2 | Comp. Example 6 | Comp. Example 7 | Example 4 |
|---|---|---|---|---|---|---|---|---|
| Inner tube rubber layer | Rubber component | NBR *1 | 100 | 100 | 100 | 100 | 100 | 100 |
| | | Other polymers *2 | 0 | 0 | 0 | 0 | 0 | 0 |
| | Vulcanization accelerator | Thiazole-based compound *3 | 1 | 1.5 | 2 | 0 | 2.5 | 2.5 |
| | | Thiuram-based compound *4 | 1.2 | 0.8 | 0.4 | 2 | 0 | 0 |
| | Other components | Carbon black *5 | 70 | 70 | 70 | 70 | 70 | 70 |
| | | Anti-oxidant *6 | 1 | 1 | 1 | 1 | 1 | 1 |
| | | Plasticizer *7 | 10 | 10 | 10 | 10 | 10 | 10 |
| | | Sulfur *8 | 1.5 | 1.5 | 1.5 | 1.5 | 1.5 | 1.5 |
| | | Zinc white *9 | 5 | 5 | 5 | 5 | 5 | 5 |
| | | Vulcanization retarder *10 | 0.5 | 0.5 | 0.5 | 0.5 | 0.5 | 0.5 |
| | | A: Concentration of sulfate ion (mol/mm$^2$) | $3.0 \times 10^{-9}$ | $2.1 \times 10^{-9}$ | $1.2 \times 10^{-9}$ | $4.6 \times 10^{-2}$ | $3.8 \times 10^{-10}$ | $3.4 \times 10^{-10}$ |
| | | t: Thickness (mm) | 1.27 | 1.25 | 1.26 | 1.24 | 1.26 | 1.25 |
| | | Outer diameter (mm) | 21.54 | 21.50 | 21.52 | 21.46 | 21.52 | 21.50 |
| Woven material underlayer | Woven base material | PET (%) | 100 | 100 | 100 | 0 | 0 | 0 |
| | | PA (%) | 0 | 0 | 0 | 0 | 0 | 100 |
| | | Vinylon ® (%) | 0 | 0 | 0 | 100 | 100 | 0 |
| | | B: Concentration of sulfate ion per 1 g of woven base material (unit: mol/g) | $2.2 \times 10^{-7}$ | $2.5 \times 10^{-7}$ | $2.3 \times 10^{-7}$ | $6.7 \times 10^{-8}$ | $7.1 \times 10^{-8}$ | $4.4 \times 10^{-7}$ |
| | | C: mass of woven base material per unit area of cylindrical side portion of woven material underlayer (g/mm$^2$) | $2.2 \times 10^{-4}$ | $2.2 \times 10^{-4}$ | $2.2 \times 10^{-4}$ | $3.1 \times 10^{-4}$ | $3.1 \times 10^{-4}$ | $1.2 \times 10^{-4}$ |
| Intermediate rubber layer | | Number of layers | 4 | 4 | 4 | 4 | 4 | 4 |
| Reinforcing material layer | | Number of layers | 4 | 4 | 4 | 4 | 4 | 4 |
| | | Laminated structure | FIG. 1 | FIG. 1 | FIG. 1 | FIG. 1 | FIG. 1 | FIG. 1 |
| | | Left side: A + t + B + C Concentration of sulfate ion (per unit area) contained in cylindrical side portions of inner tube rubber layer and woven material underlayer (mol/mm$^2$) | $3.9 \times 10^{-9}$ | $2.7 \times 10^{-9}$ | $1.6 \times 10^{-9}$ | $7.8 \times 10^{-2}$ | $2.7 \times 10^{-9}$ | $4.8 \times 10^{-10}$ |

TABLE 1-continued

| | | | | | | | |
|---|---|---|---|---|---|---|---|
| Is Relationship formula (1) satisfied? | | | Poor | Poor | Excellent | Poor | Poor | Excellent |
| Water resistance performance | | | Poor | Poor | Excellent | Poor | Poor | Excellent |
| Oil resistance performance | | | Excellent | Excellent | Excellent | Excellent | Excellent | Excellent |

| | | | Comp. Example 8 | Example 5 | Example 6 | Example 6-2 |
|---|---|---|---|---|---|---|
| Inner tube rubber layer | Rubber component | NBR *1 | 100 | 100 | 100 | 100 |
| | | Other polymers *2 | 0 | 0 | 0 | 0 |
| | Vulcanization accelerator | Thiazole-based compound *3 | 2.5 | 2.5 | 2.5 | 2.5 |
| | | Thiuram-based compound *4 | 0 | 0 | 0 | 0 |
| | Other components | Carbon black *5 | 70 | 70 | 70 | 70 |
| | | Anti-oxidant *6 | 1 | 1 | 1 | 1 |
| | | Plasticizer *7 | 10 | 10 | 10 | 10 |
| | | Sulfur *8 | 1.5 | 1.5 | 1.5 | 1.5 |
| | | Zinc white *9 | 5 | 5 | 5 | 5 |
| | | Vulcanization retarder *10 | 0.5 | 0.5 | 0.5 | 0.5 |
| | A: Concentration of sulfate ion (mol/mm$^3$) | | $1.1 \times 10^{-10}$ | $2.0 \times 10^{-10}$ | $3.4 \times 10^{-10}$ | $5.5 \times 10^{-10}$ |
| | t: Thickness (mm) | | 0.42 | 0.81 | 1.26 | 1.96 |
| | Outer diameter (mm) | | 19.84 | 20.62 | 21.52 | 22.96 |
| Woven material underlayer | Woven base material | PET (%) | 100 | 100 | 100 | 100 |
| | | PA (%) | 0 | 0 | 0 | 0 |
| | | Vinylon ® (%) | 0 | 0 | 0 | 0 |
| | B: Concentration of sulfate ion per 1 g of woven base material (unit: mol/g) | | $2.1 \times 10^{-7}$ | $2.1 \times 10^{-7}$ | $2.4 \times 10^{-7}$ | $2.3 \times 10^{-7}$ |
| | C: mass of woven base material per unit area of cylindrical side portion of woven material underlayer (g/mm$^2$) | | $2.4 \times 10^{-4}$ | $2.3 \times 10^{-4}$ | $2.2 \times 10^{-4}$ | $2.1 \times 10^{-4}$ |
| Intermediate rubber layer | Number of layers | | 4 | 4 | 4 | 4 |
| Reinforcing material layer | Number of layers | | 4 | 4 | 4 | 4 |
| | Laminated structure | | FIG. 1 | FIG. 1 | FIG. 1 | FIG. 1 |
| | Left side: A + t + B · C Concentration of sulfate ion (per unit area) contained in cylindrical side portions of inner tube rubber layer and woven material underlayer (mol/mm$^2$) | | $9.7 \times 10^{-11}$ | $2.1 \times 10^{-10}$ | $4.8 \times 10^{-10}$ | $1.1 \times 10^{-9}$ |
| | Is Relationship formula (1) satisfied? | | Excellent | Excellent | Excellent | Excellent |
| | Water resistance performance | | Poor | Excellent | Excellent | Excellent |
| | Oil resistance performance | | Poor | Excellent | Excellent | Excellent |

*1: NBR (acrylonitrile butadiene rubber), "JSR N230S" (AN content: 35 mass %), manufactured by JSR Corporation
*2: Other polymers: styrene-butadiene rubber, "SBR1500", manufactured by JSR Corporation
*3: Thiazole-based compound (MBTS), "Noccelar DM", manufactured by Ouchi Shiko Chemical Industrial Co., Ltd.
*4: Thiuram-based compound (MBTM), "Noccelar TS", manufactured by Ouchi Shiko Chemical Industrial Co., Ltd.
*5: Carbon black: FET-grade carbon black, "Asahi #65", manufactured by Asahi Carbon Co., Ltd.
*6: Anti-oxidant, "Noclac 224", manufactured by Ouchi Shiko Chemical Industrial Co., Ltd.
*7: Plasticizer: DOA (dioctyl adipate), "SANSO CIZER DOA", manufactured by New Japan Chemical Co., Ltd.
*8: Sulfur, "SULFAX 5", manufactured by Tsurumi Chemical Industry Co., Ltd.
*9: Zinc white, "Ginrei SR", manufactured by Toho Zinc Co., Ltd,
*10: Vulcanization retarder, "Santogard PVI", manufactured by Monsanto Company

INDUSTRIAL APPLICABILITY

The hose of the present disclosure can be suitably used for a high pressure rubber hose or the like.

REFERENCE SIGNS LIST

1 Hose
2 Inner tube rubber layer
3 Woven material underlayer
4 Intermediate rubber layer
5 Reinforcing material layer
6 External cover rubber layer

The invention claimed is:
1. A hose having:
an inner tube rubber layer;
a substantially cylindrical woven material underlayer having a woven base material and provided on the outer peripheral side of the inner tube rubber layer; and
a reinforcing material layer having a reinforcing material and provided on the outer peripheral side of the woven material underlayer,
wherein the inner tube rubber layer is made of a rubber composition for a hose inner tube,
the woven base material is formed by organic fibers made of polyamide (PA) or polyethylene terephthalate (PET),
the rubber composition for a hose inner tube includes a rubber component and a vulcanization accelerator,
100 parts by mass of the rubber component contains at least 60 parts by mass of acrylonitrile butadiene rubber (NBR) therein,
the inner tube rubber layer has thickness equal to or larger than 0.5 mm, and
following relationship formula (1) is satisfied,

$$A \cdot t + B \cdot C < D \tag{1}$$

wherein, in relationship formula (1), "A" represents concentration of sulfate ion in the inner tube rubber layer (unit: mol/mm$^3$), "t" represents thickness of the inner tube rubber layer (unit: mm), "B" represents concentration of sulfate ion per 1 g of the woven base material (unit: mol/g), "C" represents mass of the woven base material per unit area of a cylindrical side portion of the woven material underlayer (unit: g/mm$^2$), and "D" represents a constant of $2.5×10^{-9}$ (unit: mol/mm$^2$).

2. The hose of claim 1, wherein content of a thiuram-based compound contained in the inner tube rubber layer is $3.1×10^{-5}$ mol or less per 1 g of the rubber component.

3. The hose of claim 1, wherein the vulcanization accelerator includes at least one selected from the group consisting of a thiazole-based compound, a sulfenamide-based compound, and a guanidine-based compound.

4. The hose of claim 1, wherein at least one intermediate rubber layer and at least one reinforcing material layer are alternately provided on the outer peripheral side of the woven material underlayer, and an external cover rubber layer is provided on the outer peripheral side of the outermost reinforcing material layer.

5. The hose of claim 1, wherein 100 parts by mass of the rubber component contains at least 70 parts by mass of acrylonitrile butadiene rubber (NBR) therein.

6. The hose of claim 1, wherein the woven base material is formed by organic fibers made of polyamide (PA).

7. The hose of claim 2, wherein the vulcanization accelerator includes at least one selected from the group consisting of a thiazole-based compound, a sulfonamide-based compound, and a guanidine-based compound.

8. The hose of claim 2, wherein at least one intermediate rubber layer and at least one reinforcing material layer are alternately provided on the outer peripheral side of the woven material underlayer, and an external cover rubber layer is provided on the outer peripheral side of the outermost reinforcing material layer.

9. The hose of claim 3, wherein at least one intermediate rubber layer and at least one reinforcing material layer are alternately provided on the outer peripheral side of the woven material underlayer, and an external cover rubber layer is provided on the outer peripheral side of the outermost reinforcing material layer.

10. The hose of claim 2, wherein 100 parts by mass of the rubber component contains at least 70 parts by mass of acrylonitrile butadiene rubber (NBR) therein.

11. The hose of claim 3, wherein 100 parts by mass of the rubber component contains at least 70 parts by mass of acrylonitrile butadiene rubber (NBR) therein.

12. The hose of claim 4, wherein 100 parts by mass of the rubber component contains at least 70 parts by mass of acrylonitrile butadiene rubber (NBR) therein.

13. The hose of claim 2, wherein the woven base material is formed by organic fibers made of polyamide (PA).

14. The hose of claim 3, wherein the woven base material is formed by organic fibers made of polyamide (PA).

15. The hose of claim 4, wherein the woven base material is formed by organic fibers made of polyamide (PA).

16. The hose of claim 5, wherein the woven base material is formed by organic fibers made of polyamide (PA).

17. The hose of claim 1, wherein 100 parts by mass of the rubber component contains at least 80 parts by mass of acrylonitrile butadiene rubber (NBR) therein.

18. The hose of claim 1, wherein $A·t+B·C<1.7×10^{-9}$ (unit: mol/mm$^2$).

19. The hose of claim 1, wherein $A·t+B·C<6.1×10^{-10}$ (unit: mol/mm$^2$).

20. The hose of claim 1, wherein content of acrylonitrile in acrylonitrile butadiene rubber (NBR) is in the range of 20-41 mass %.

* * * * *